# 3,844,996
PREPARATION OF POLYMER SOLUTIONS
William Lee Fichteman, Louisville, Ky., assignor to E. I. du Pont de Nemours and Company, Wilmington, Del.
No Drawing. Filed Apr. 3, 1972, Ser. No. 240,766
Int. Cl. C08c 11/72; C08d 9/14
U.S. Cl. 260—23.7 H                                    8 Claims

ABSTRACT OF THE DISCLOSURE

Solutions of polymers in organic liquids can be prepared by (A) providing a polymer latex obtained by polymerization in an alkaline aqueous emulsion containing a suitable anionic emulsifier (e.g., a rosin soap), (B) mixing with the latex a sensitizer composed of a latex-soluble amine or quaternary ammonium compound having both an anionic and a cationic site and having a hydrocarbyl group of at least 6 carbon atoms (e.g., C-cetyl betaine), (C) mixing with the resulting sensitized latex (1) a water-immiscible organic liquid which is a solvent for the polymer and (2) enough acid to give the resulting mixture a pH of about 1–6, thereby forming a composition in which the polymer is in solution in the organic liquid, and (D) removing water from the composition.

BACKGROUND OF THE INVENTION

This invention relates to a process for preparing solutions of polymers in organic liquids. It also relates to the preparation of sensitized latex compositions useful in the manufacture of such solutions.

It is known in the art that polychloroprene and other polymers can be prepared economically and safely by an emulsion polymerization process which provides an alkaline polymer latex containing a rosin soap or the like as the anionic emulsifier. The resulting aqueous dispersion of fine particles of water-insoluble polymer is a latex known to be useful in the manufacture of latex paints, latex adhesives, solid (dried) polymer products and the like. However, aqueous compositions are undesirable or harmful in a number of applications, for example when using a substrate that could be damaged by water.

It is necessary or desirable in many cases to provide a polymeric coating composition, adhesive or the like wherein the polymer is present as a solution in a suitable organic liquid. But the known procedures for converting a latex to a solution of the polymer in an organic liquid have drawbacks which restrict or prevent their use for certain applications. For example, removal of the water from the latex by means of a heated evaporation apparatus may result in a dried polymer that is (a) too expensive to be useful in making the polymer solution because of the cost of removing the water, or (b) unable to dissolve properly in the organic liquid because of chemical or physical changes in the polymer caused by the drying process.

There is a need for a new and beneficially useful way to convert a polymer latex to a polymer solution. There is also a need for a way to prepare a polymer latex that permits the latex to be converted to a polymer solution directly (without first removing the water), either immediately or after the latex has been subjected to normal storing and shipping conditions.

SUMMARY OF THE INVENTION

The present invention provides a process which comprises:

(A) Providing a polymer latex which is the product of polymerizing at least one monomer in an alkaline aqueous emulsion containing an anionic emulsifier selected from the group: rosin soap, soaps of modified rosin, and soaps of fatty acids, and (B) Mixing with said latex about 0.5–2.0 equivalents, per equivalent of said anionic emulsifier present in the latex, of a sensitizer which is soluble in the latex and selected from the group: amines and quaternary ammonium compounds having an anionic site and a cationic site and having a hydrocarbyl group of at least 6 carbon atoms.

The invention also provides the novel sensitized polymer latex obtained by this process.

The resulting sensitized latex is a useful article of commerce which can be converted directly to a polymer solution simply by the addition of a suitable organic solvent and an acid in the manner described below. This "conversion operation" can be done either immediately or after the sensitized latex has been subjected to storage and shipment.

DESCRIPTION OF PREFERRED EMBODIMENTS

An especially useful embodiment of the invention comprises mixing with the sensitized latex resulting from step (B)

(1) An organic liquid which is a solvent for the polymer and is substantially water-immiscible, and (2) An acid in an amount sufficient so that the resulting mixture has a pH of about 1–6, thereby forming a composition in which the polymer is in solution in the organic liquid, and removing substantially all of the water from the resulting composition.

The latex provided in step (A) preferably has a polymer content of about 30–70% by weight and a pH of about 7.2–13. However, it is often preferred to dilute the latex with water to a polymer content of about 24–28% by weight before converting the latex to a solution by the present conversion process.

The latex pH is kept at least slightly above 7 before the conversion operation to enhance its storage stability. In preparing the latex of step (A), one can use as the emulsifier (soap) any suitable known water-soluble salt (e.g., a potassium, sodium or ammonium salt) of at least one of the following: rosin, fatty acid, and modified rosin (e.g., hydrogenated, disproportionated or partially polymerized rosin). A typical emulsifier of this type is described in U.S. Pat. 3,392,134 (e.g., in column 3).

It is preferred in many applications to use a latex of a chloroprene polymer selected from the following: polychloroprene and copolymers of about 50–99% by weight of chloroprene and about 1–50% by weight of a monomer copolymerizable therewith. Also useful are other known polymers which can be prepared in an alkaline aqueous emulsion as described in step (A), and which have the desired degree of insolubility in water, acid resistance, solubility in an organic solvent and other properties according to the requirements of a particular application of the product. Examples of the useful known procedures for preparing a latex according to step (A) of this process are described in Example 1 of U.S. Pat. 3,300,433 (column 4, lines 56–74), Example 1 of U.S. Pat. 3,318,834 (column 5, lines 15–35), and U.S. Pat. 3,079,365 (procedures A–1 and A–4 of column 4). Useful procedures for preparing other known latex compositions according to step (A) are well known in the art.

The preferred amount of sensitizer to use in step (B) is usually about 0.6–1.5 equivalents per equivalent of the anionic emulsifier. An equivalent of anionic emulsifier may be defined as its equivalent weight calculated by dividing the molecular weight by the number of carboxylate anions per molecule. An equivalent weight of the sensitizer is similarly calculated by dividing its molecular weight by the number of quaternary ammonium groups or amino groups per molecule.

During step (B), the temperature of the latex can be any temperature which is not harmful to the latex (e.g., does not cause coagulation), and which enables the sensitizer to be dissolved in the latex.

Among the most useful sensitizers to employ in step (B) are C-cetyl betaine, N-cetyl betaine, and N-(3-cocoamidopropyl)betaine. In the cocoamido compound just mentioned, the "coco" refers to the alkyl groups (e.g., $C_{12}$, $C_{14}$, etc. alkyl groups) present in the mixture of acids known in the art to be obtained by the hydrolysis of coconut oil. This cocoamido compound has a formula: $RCONH(CH_2)_3N^{\oplus}(CH_3)_2CH_2COO^{\ominus}$ where RCO is derived from the acids of coconut oil. This compound is also known in the art by the name: (carboxymethyl)(dimethyl)(3 - acylamidopropyl)ammonium hydroxide inner salt; the acyl is derived from the acids of coconut oil.

Other useful sensitizers can be illustrated by such compounds as N-stearyl betaine, stearyl ammonium sulfonic acid betaine, cetyl ammonium sulfonic acid betaine, and other known betaines within the sensitizer description given above in step (B). These betaines have within each molecule a quaternary ammonium cation and a carboxylate or a sulfonate anion; and they have the specified hydrocarbyl group on either a nitrogen atom or a carbon atom. Useful sensitizers are further illustrated by such compounds as N-coco-beta-aminopropionic acid, N-dodecyl glycine, N-hexadecyl glycine, N-octadecyl glycine, N-dodecyl alanine, N-dodecyl beta alanine, N-hexadecyl beta alanine, 2-amino-octadecanoic acid, 2-amino myristic acid, and other amines within the sensitizer description given above. The hydrocarbyl group of the sensitizer contains at least 6 (preferably at least 12) carbon atoms; however, the number of carbon atoms must not be large enough to prevent the sensitizer from being soluble in the latex in the amount being used. It will be apparent that the solubility of a particular sensitizer in the latex will depend to some extent on the pH and the temperature of the latex. Some of the most useful sensitizers are soluble either in pure water or in water that has been made weakly alkaline (e.g., having a pH of about 7.1 to 8). Some sensitizers are soluble only in water (or a latex) that has been made alkaline enough to have a pH well above 8.

The acid which is mixed with the sensitized latex to provide the degree of acidity needed in the conversion operation is preferably sulfuric acid, hydrochloric acid or nitric acid. Such acids are preferably first diluted with water to an acid content of about 1–5% by weight. This makes it easier to add the acid without coagulation of the latex. In many cases it is preferred to add enough acid to the polymer composition so that the resulting mixture has a pH of about 3–4. The use of the acid in combination with the particular sensitizers specified in step (B) plus the required emulsifier and organic liquid results in a surprisingly effective conversion of the composition from an aqueous dispersion of the polymer to a solution of the polymer in the organic liquid. The polymer is transferred directly from the aqueous phase to the organic solvent phase during this novel conversion operation.

In some applications, the organic liquid which is mixed with the sensitized latex is a liquid which is volatile enough so that it can be evaporated from the resulting polymer solution at a temperature below the decomposition temperature of the polymer. This is true for example when preparing various adhesive and coating compositions which can be dried by evaporation of the organic solvent after being applied to a substrate. In other applications, an organic liquid is used which is substantially nonvolatile at the highest temperatures to which the product will be subjected during preparation and use, for example temperatures just below the decomposition temperature of the polymer. Illustrations include the use of known rubber extender oils when preparing oil-extended rubber compositions for the manufacture of molded rubber products; and the use of a plasticizer in a plastic composition. It is also possible to use combinations of volatile and nonvolatile organic liquids in the present process, the volatile liquid being evaporated during preparation of the end product and the nonvolatile liquid remaining in the composition of the end product.

An organic liquid (solvent) is used which has sufficient solubility for the polymer so that the polymer is in solution in the solvent after the acid and solvent components have been thoroughly mixed wtih the composition. It is often preferred to use a solvent capable of dissolving the polymer at ordinary temperatures of about 15–30° C. Known procedures and tables can be used to consider solubility parameters and hydrogen bonding as an aid to the selection of organic liquids having the desired solubility for the polymers to be used. For example, one can use the information given by E. P. Lieberman in the "Official Digest" of the Federation of Societies for Paint Technology, Volume 34, No. 444, pages 30–50 (January 1962).

In the present conversion process which comprises converting the sensitized latex resulting from step (B) to a composition in which the polymer is in solution in the organic liquid, it is preferred in many cases to mix all or part of the organic liquid with the latex before adding the acid. It is also possible to add part of the acid before adding any of the organic liquid, the amount of acid initially added being less than the predetermined amount needed for the conversion operation. Then the organic liquid is added in the predetermined amount needed for the conversion operation, followed by the addition of the rest of the predetermined amount of acid needed for effective conversion of the latex to a polymer solution. It is also possible, in some cases, to add all of the acid initially, especially when the organic liquid is added very soon thereafter. The addition of acid and organic solvent can be carried out at a temperature within the range of ordinary room temperatures or slightly below to elevated temperatures that are not harmful to the ingredients of the composition. One skilled in the art, after reading the present disclosure, will have no difficulty in selecting suitable operating conditions and ingredients to fit the needs of a particular application of the present invention.

To remove substantially all (e.g., about 90–100%) of the water (aqueous phase) from the composition resulting from the conversion operation, one can employ any suitable known liquid separation method, for example by settling, decantation, use of separating funnel, using a centrifuge, or by combining two or more such methods. A centrifuge method is especially useful when the composition has a relatively low organic liquid content, when the organic liquid or the aqueous phase is quite viscous, or when it is important that absolutely no water remain in the product. In many cases it is advisable to reduce the water content of the polymer solution product to about 0–1% by weight.

Additives known to be useful in the manufacture of polymeric adhesives, coating compositions and the like can be added to the compositions obtained by the novel processs, for example, curing agents, tack-enhancing agents, resins, coloring agents, fungicides, and stabilizers.

The invention provides a process which is useful for the manufacture of a sensitized polymer latex which can be converted to a polymer solution in a rapid and economical manner. The conversion operation can be performed either on freshly prepared latex or on latex which has been stored or shipped. The invention also provides a process for directly converting a polymer latex composition to a solution composition comprised of a solution of the polymer in a volatile or nonvolatile liquid. It is a beneficial result of the invention that a sensitized latex can be prepared which is stable enough that it can be stored or shipped, and yet it can be readily converted later to a polymer solution by the simple addition of solvent and dilute acid. There is no need to perform the conversion operation very soon after adding the sensitizer, although in some cases one might choose to do so. The invention also makes it possibble to carry out a conversion process wherein a relatively large proportion (e.g., about 90–98%) of the water present in the composition separates from the organic phase on completion of the conversion operation.

The novel conversion process is very useful for the manufacture of adhesives, impregnating compositions, film-forming compositions, coating compositions and the like which can be applied to substrates (including water-sensitive substrates) and dried by evaporation of the organic solvent. It is also useful for the manufacture of oil-extended rubber compositions, and plastic compositions containing a plasticizer. Known fillers, pigments and other additives can be mixed with the composition either before or after removal of volatile components. Any volatile solvent initially present in such compositions can of course be removed by known methods if a dried material is needed; a typical use would be in the manufacture of molded products.

The following examples illustrate the invention; all amounts are by weight unless otherwise indicated.

Example 1

A sensitized polychloroprene latex which is useful for the manufacture of a polymer solution is prepared by (1) providing 3.5 parts of an anionic emulsifier composed of disproportionated wood rosin which has been partially neutralized with sodium carbonate so that it has an acid number of 140; (2) forming a solution in 100 parts of chloroprene of the modified rosin provided in step (1) and 0.16 part of dodecylmercaptan; (3) forming an emulsion by mixing the resulting solution with 115.9 parts of an aqueous solution of 0.55 part of sodium hydroxide, 0.54 part of sodium sulfite, 0.005 part of the sodium salt of anthraquinone-2-sulfonic acid, 0.10 part of sodium formaldehyde sulfoxylate, and 0.50 part of a surfactant which is the sodium salt of the condensation product of naphthalene sulfonic acid with formaldehyde; (4) cooling the emulsion to 15° C. and placing it in a polymerization flask provided with a nitrogen atmosphere; (5) initiating the polymerization of the chloroprene by mixing with the emulsion a catalyst solution composed of 2.47 parts of water, 0.0035 part of cumene hydroperoxide, 0.0025 part of octyl phenoxy polyethoxy ethanol, 0.025 part of potassium persulfate and 0.0012 part of sodium anthraquinone-2-sulfonate; (6) cooling the resulting mixture to 10° C. and keeping it at this temperature by means of a cooling jacket on the flask while adding a catalyst solution having the proportion of ingredients described in step (5) at a rate sufficient to maintain a substantially constant rate of polymerization, and while allowing the polymerization to continue until the specific gravity of the mixture reaches 1.075, indicating about 80% of the monomer has been converted to polychloroprene; (7) adjusting temperature of the mixture to 20° C., and "short stopping" the polymerization by adding to the mixture an emulsion formed by mixing components 7a and 7b, component 7a being a solution in 0.75 part of water of 0.022 part of sodium lauryl sulfate and 0.023 part of sodium salt of the condensation product of naphthalene sulfonic acid with formaldehyde, and component 7b being a solution of 1.6 parts of toluene of 0.025 part of phenothiazine and 0.025 part of di(tertiary butyl)hydroquinone; (8) removing the remaining monomer and some of the water by any suitable known means, for example, by steam distilling the resulting polymer latex in the manner described in U.S. Pat. 2,467,769 (see column 5, lines 27–52 except for solids content) to provide a latex whose solids content is about 41.5%; (9) mixing with the resulting latex enough 2% aqueous sulfuric acid to lower the pH of the latex to 9.0; and (10) mixing with each 100 parts of the latex 4.9 parts of a 34% aqueous solution of the sensitizer C-cetyl betaine. The latex now contains 1.1 equivalent of the sensitizer per equivalent of the modified rosin soap (anionic emulsifier) present therein.

When the resulting sensitized polychloroprene latex is stored for 16 weeks at 22° C., it is found to be unharmed by the storage period; and like the freshly prepared latex, it is useful for the manufacture of a polychloroprene solution by the conversion process of this invention.

Example 2

A polychloroprene solution is prepared by (a) mixing 100 grams of sensitized polychloroprene latex prepared in the manner described in Example 1 with 112 grams of water; (b) mixing the diluted latex with 135 grams of a substantially water-immiscible organic solvent for polychloroprene composed of 50% hexane and 50% toluene; (c) adding to the resulting composition with stirring enough 2% aqueous sulfuric acid so that the composition has a pH of 3.5; (d) shaking the resulting composition vigorously for one hour in a 16-ounce bottle mounted on a mechanical shaker, thereby forming a composition in which the polymer is in solution in the organic solvent; (e) allowing the composition to stand without agitation for 18 hours and to separate into two layers, the bottom layer being a relatively clear aqueous layer and the top layer being the polymer solution; (f) removing the aqueous layer by means of a separatory funnel; and (g) mixing 67.5 grams of 2-butanone with the polymer solution remaining in the funnel.

During the early part of step (e), the composition begins to separate into two layers very quickly. During the first three hours of step (e), 90% of the water in the composition separates into the bottom layer; within 18 hours, 95% of the water separates into the bottom layer.

The polymer solution obtained in step (g) has a polychloroprene content of about 15%, a water content of about 2.7%, and a viscosity of 1600 centipoises as measured at 25° C. by a Brookfield viscometer (LV3 spindle at 30 r.p.m.). The volatile organic solvent portion of the composition is composed of about equal parts of hexane, toluene and 2-butanone. As indicated previously, before the polymer solution is used for the manufacture of a solution type adhesive or coating composition, it is often preferred to reduce the water content to about 0–1% by means of a centrifuge or other suitable known water separation apparatus.

Example 3

A sensitized polychloroprene latex is prepared in the manner described in Example 1 except step (10) consists of mixing with each 100 parts of the latex 2.25 parts of a 30% aqueous solution of N-(3-cocoamidopropyl)betaine. The latex now contains 0.6 equivalent of the sensitizer per equivalent of the modified rosin soap. The resulting sensitized latex can be stored for several weeks at 22° C. and still be used for the manufacture of a polymer solution by the present conversion process.

A polychloroprene solution is prepared in the manner described in Example 2 except (1) step (a) consists of mixing 100 grams of a sensitized latex prepared as described in the previous paragraph with 118 grams of water;
(2) in step (c), enough acid is added so that the composition has a pH of 3.2; and
(3) in step (e), the composition is allowed to stand for three hours; this results in a separation of 94% of the water into the bottom layer. Thus, the bottom layer contains 94% of the water that was present in the composition at the end of step (c).

Example 4

A sensitized latex of a styrene-butadiene copolymer which can easily be converted to a polymer solution by the present conversion process either immediately or after several weeks of storage is prepared by (1) dissolving 3 grams of potassium persulfate in 1800 grams of water; (2) forming an emulsion by mixing with the resulting solution 20 grams of the potassium salt of disproportionated wood rosin, 25 grams of potassium oleate, 700 grams of butadiene, 300 grams of styrene, and 5 grams of dodecylmercaptan; (3) placing the resulting emulsion in a pressure-type polymerization flask provided with a nitrogen atmosphere; (4) heating the emulsion to 50° C. and keeping at this temperature while under autogenous pressure until polymerization occurs to about 50% conversion as calculated from the solids content; (4) short stopping the polymerization by adding to the mixture 1 gram of hydroquinone; (5) removing the remaining monomer and some of the water by means of a conventional rotary evaporator at about 25 mm. of mercury absolute pressure to provide a latex containing about 63% of a copolymer of about 30% styrene and 70% butadiene; (6) mixing with the latex enough 2% aqueous sulfuric acid to lower the pH of the latex to 9.0; and (7) mixing with each 100 parts of the latex 8.6 parts of a 30% solution of C-cetyl betaine. The latex now contains 0.8 equivalent of the sensitizer per equivalent of modified rosin soap.

Example 5

A styrene-butadiene copolymer solution is prepared by (a) mixing 100 grams of sensitized latex prepared in the manner described in Example 4 with 285 grams of water; (b) mixing the diluted latex with 330 grams of heptane; (c) adding to the resulting composition with stirring enough 2% aqueous sulfuric acid so that the composition has a pH of 3.0; (d) shaking the composition for one hour to form a composition in which the copolymer is in solution in the heptane; (e) allowing the composition to stand for two hours to separate into a bottom aqueous layer containing about 92% of the water and a top polymer solution layer; and (f) removing the aqueous layer by means of a separatory funnel.

Example 6

A sensitized polychloroprene latex is prepared in the manner described in Example 1 except step (10) consists of mixing with each 100 parts of the latex 4.1 parts of a 50% aqueous solution of cetyl ammonium sulfonic acid betaine. The latex now contains 1.5 equivalents of sensitizer per equivalent of modified rosin soap.

The polychloroprene solution having a solids content of about 22% is prepared in the manner described in Example 2 except (1) step (a) consists of mixing 85 grams of the sensitized latex prepared as described in the previous paragraph with 100 grams of water;
(2) in step (c), enough acid is added so that the composition has a pH of 3.0; and
(3) in step (e), the composition is allowed to stand for three hours, resulting in the separation of over 90% of the water into the bottom layer.

I claim:

1. A process for preparing a polymer solution from a polymer latex which comprises
    (A) providing a polymer latex which is the product of carrying out a polymerization reaction to form a chloroprene polymer or a styrene-butadiene copolymer in an alkaline aqueous emulsion containing an anionic emulsifier selected from the group: rosin soap, soaps of disproportionated and hydrogenated rosin and soaps of fatty acids other than rosin fatty acids,
    (B) mixing with said latex about 0.5–2.0 equivalents, per equivalent of said anionic emulsifier present in the latex, of a sensitizer which is soluble in the latex and selected from the group: amines and quaternary ammonium compounds having an anionic site and a cationic site and having a hydrocarbyl group of at least 6 carbon atoms,
    (C) mixing with the latex resulting from step (B)
        (1) an organic liquid which is a solvent for the polymer and is substantially water-immiscible, and
        (2) an acid in an amount sufficient so that the resulting mixture has a pH of about 1–6, thereby forming a composition in which the polymer is in solution in the organic liquid, said acid being selected from the group: sulfuric acid, hydrochloric acid and nitric acid, and
    (D) removing substantially all of the water from the resulting composition.

2. A process according to Claim 1 wherein the latex of step (A) has a polymer content of about 30–70% by weight and a pH of about 7.2–13.

3. A process according to Claim 1 wherein the polymer of the latex is a chloroprene polymer selected from the group: polychloroprene and copolymers of about 50–99% by weight of chloroprene and about 1–50% by weight of a monomer copolymerizable therewith.

4. A process according to Claim 1 wherein the amount of sensitizer used in step (B) is about 0.6–1.5 equivalents.

5. A process according to Claim 1 wherein the sensitizer used in step (B) is selected from the group: C-cetyl betaine, N-cetyl betaine, and N-(3-cocoamidopropyl) betaine.

6. A process according to Claim 1 wherein the acid mixed with the latex is one that has been diluted with water to an acid content of about 1–5% by weight.

7. A process according to Claim 1 wherein the acid is added until the mixture has a pH of about 3–4.

8. A process according to Claim 1 wherein the organic liquid is volatile enough so that it can be evaporated from the resulting polymer solution at a temperature below the decomposition temperature of the polymer.

References Cited

UNITED STATES PATENTS

| 3,311,579 | 3/1967 | Donat | 260—23 EM |
| 2,413,197 | 12/1946 | Smith et al. | 260—23 EM |
| 3,392,134 | 7/1968 | Apotheker | 260—92.3 |
| 3,079,365 | 2/1963 | Anderson | 260—890 |
| 2,129,264 | 9/1938 | Baxter | 260—404 |

OTHER REFERENCES

Skeist: "Handbook of Adhesives," 1962, pp. 434–438.

DONALD E. CZAJA, Primary Examiner

W. E. PARKER, Assistant Examiner

U.S. Cl. X.R.

260—23 EM, 23.7 H, 23.7 M, 27 R, 29.6 R, 29.7 R, 404, 880